United States Patent [19]

Akiyama

[11] 3,955,209

[45] May 4, 1976

[54] DEVICE FOR CONTROLLING AN ELECTRIC FOCAL PLANE SHUTTER

[75] Inventor: Kazuhiro Akiyama, Omiya, Japan

[73] Assignee: Fuji Photo Optical Co. Ltd., Omiya, Japan

[22] Filed: June 4, 1974

[21] Appl. No.: 476,339

[30] Foreign Application Priority Data

June 7, 1973 Japan ................................ 48-64042

[52] U.S. Cl. .................................. 354/234; 354/51; 354/60 R; 354/237; 354/238

[51] Int. Cl.² ............................................ G03B 9/08

[58] Field of Search ............ 354/237, 238, 51, 60 R, 354/234

[56] References Cited

UNITED STATES PATENTS

| | | | |
|---|---|---|---|
| 3,595,154 | 7/1971 | Espig | 354/234 |
| 3,641,902 | 2/1972 | Kikuchi et al. | 354/238 |
| 3,718,077 | 2/1973 | Ono | 354/238 |

*Primary Examiner*—L. T. Hix
*Assistant Examiner*—Russell E. Adams, Jr.

[57] ABSTRACT

A device for controlling an electric focal plane shutter in a camera is described, in which an electromagnet which controls the timing of a trailing curtain of the shutter is excited in response to the depression of a shutter release member and demagnetized when a predetermined time has lapsed. An actuating member is provided between the shutter release member and a leading curtain holding lever so that the leading curtain may be released upon operation of the actuating member. A blocking lever is provided to block the actuating member. The blocking lever is moved to a position to release the actuating member by the excitation of the magnet. Further, by the excitation of the magnet, a starting lever which brings the trailing curtain holding lever to its holding position is actuated to bring the latter to the holding position. A delay circuit is provided in the device to delay the excitation of the magnet.

5 Claims, 7 Drawing Figures

FIG. I

DEVICE FOR CONTROLLING AN ELECTRIC FOCAL PLANE SHUTTER

BACKGROUND OF THE INVENTION

1. Field of the Invention

This invention relates to a device for controlling a focal plane electric shutter, and more particularly to a device for controlling the timing of the start of the shutter curtains of an electrically controlled focal plane shutter.

2. Description of the Prior Art

Various types of electric shutters have heretofore been proposed and developed. In a focal plane shutter, the shutter speed or the exposure time is usually controlled by controlling by an electromagnetic means the timing of the start of the trailing curtain after the start of the leading curtain. The period of the delay from the start of the leading curtain to the start of the trailing curtain is normally controlled by use of the time constant of an RC circuit which includes a photodetector. The RC circuit is connected with an electromagnet which releases a holding means which holds the trailing curtain.

In such a type of electric focal plane shutter, a difficulty arises when a selftimer is used on the camera. When a selftimer is used simply in a mechanical or electrical connection with a shutter release member in the camera, the electromagnet to be operated to release the trailing curtain is excited from the start of the operation of the selftimer, which results in a waste consumption of the cell loaded in the camera. In the conventional electric focal plane shutter, the control of the shutter speed becomes impossible when the voltage of the cell is lowered beyond a predetermined level.

SUMMARY OF THE INVENTION

In the light of the foregoing observations and description, the primary object of the present invention is to provide a device for controlling an electric focal plane shutter in which the cell is not excited until the operation of the selftimer comes to an end.

Another object of the present invention is to provide a device for controlling an electric focal plane shutter in which an electromagnet for operating a shutter starting lever is not actuated when the voltage of the cell in the camera is lower than a predetermined level.

Still another object of the present invention is to provide a device for controlling an electric focal plane shutter which makes the operation of the shutter release smooth and light.

In accordance with the present invention, the above objects are accomplished by providing a magnet which is excited in response to the depression of a shutter release member and demagnetized after a predetermined time has lapsed, and which controls the timing of the start of the trailing curtain. Further, in the present invention, an actuating member is provided between the shutter release member and a leading curtain holding lever associated therewith to actuate the latter for releasing the leading curtain, and a blocking lever for preventing the movement of said actuating member is provided to be operated by said magnet. By the excitation of the magnet, said blocking lever is brought to a position in which said actuating member is released and a trailing curtain holding lever is brought to a position to hold the trailing curtain by means of a starting lever which is operated by the magnet. Thus, by the operation of the starting lever performed by the magnet upon excitation thereof, the leading curtain is enabled to start.

Further, in addition to the above construction, the device in accordance with the present invention is provided with a delay circuit in the electric circuit to control said magnet for delaying the excitation of the magnet and accordingly the timing of the start of said starting lever.

In accordance with the present invention as described above, the magnet is not excited even if the shutter release member is operated when the voltage of the cell falls below a predetermined level and accordingly the starting lever is not operated. Further, since the starting lever is not operated, the blocking lever is kept so as to be in its blocking position to prevent the movement of the actuating member and the leading curtain is not released. Therefore, the shutter is not operated to expose the film in the camera when the voltage of the cell falls below a predetermined level. Thus, the photographer is able to know that the voltage level of the cell has fallen and the waste of the film can be prevented.

Further, in accordance with the present invention, the shutter release operation can be performed with a very light touch of the shutter release button or the like since the shutter release is started by excitation of a magnet which is electrically operated. Further, the operation of the magnet is delayed by means of a switch provided in the electric circuit to excite the magnet and is controlled by an electrical or mechanical controlling means so that the magnet may not be excited until the operation of the selftimer comes to an end. Thus, the waste consumption by the magnet is prevented. In addition, since the shutter release is controlled by excitation of the magnet, the synchronization of the shutter release with an electric device such as a remote-control device or a motor driving device can easily be performed.

DESCRIPTION OF THE PREFERRED EMBODIMENT

Figure 1:
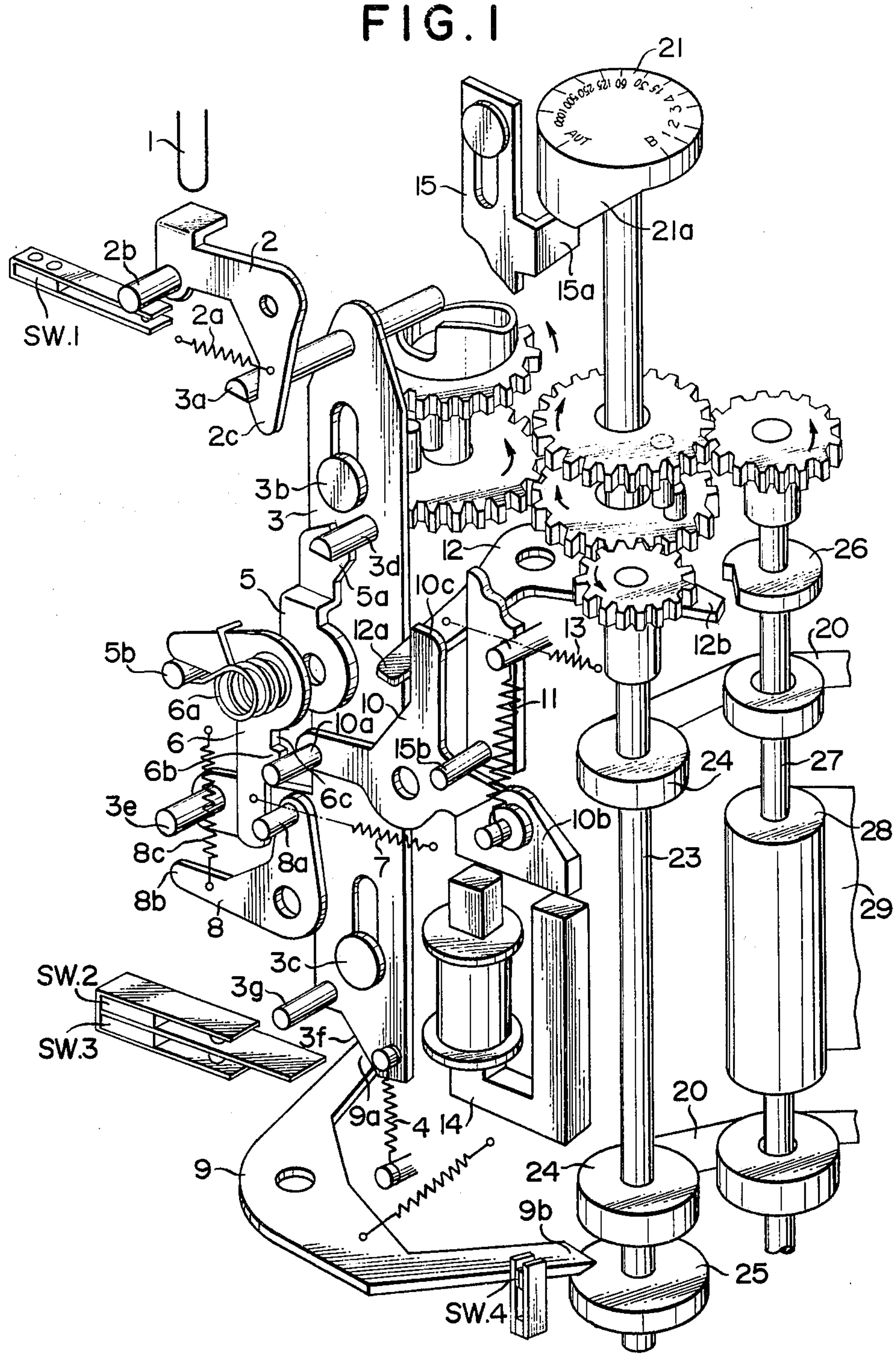
FIG. 1 is a perspective view of the device for controlling an electric focal plane shutter in accordance with a preferred embodiment therof.

An embodiment of the mechanism employed in the device of this invention is illustrated in FIG. 1 in which a shutter release button 1 is shown in its upper position. The shutter release button 1 is movable up and down and normally urged upward by means of a spring or the like.

The embodiment shown in FIG. 1 is an electric shutter of a focal plane type which cn be automatically controlled by means of an exposure measuring system as well as manually controlled by a mechanical controlling means.

A shutter release lever 2 is rotatably provided under the shutter release button 1 so as to be rotated counterclockwise thereby when the shutter release button 1 is depressed. The shutter release lever 2 is urged by means of a tension spring 2a in the clockwise direction. The shutter release lever 2 has a pin 2b which is brought into a switch closing position to close a first switch SW1 when the lever 2 is rotated counterclockwise upon depression of the shutter release button 1. The lower portion of the shutter release lever 2 is formed into a hook 2c to hold a pin 3a fixed to an operating plate 3 which is movable up and down and urged downward by means of a tension spring 4. When the shutter release lever 2 is not depressed by the shutter release button 1, the hook 2c is engaged with the pin 3a to hold the operating plate 3 in its upper position. When the shutter release lever 2 is rotated counterclockwise by the depression of the shutter release button 1, the hook 2c is disengaged from the pin 3a to release the downward movement of the operating plate 2. The operating plate 3 is movable up and down and is guided in this movement by two pins 3b and 3c fixed to a part of the camera body. The operating plate 3 is moved upward against the force of the tension spring 4 by a shutter charging means which is operated in response to a film wind-up operation of a film wind-up lever (not shown). When the operating plate 3 is moved upward to the uppermost position, the pin 3a is engaged with said hook 2c and held in position thereby. A blocking lever 5 to prevent the downward movement of the operating plate 3 is rotatably provided in the camera body, an end 5a of which is engaged with a pin 3d fixed on the operating plate 3 to block the downward movement of the pin 3d as shown in FIG. 1. The blocking lever 5 is provided with an operating lever 6 coaxially associated therewith. The operating lever 6 is urged in the counterclockwise direction by means of a spring 6a engaged at an end thereof with a pin 5b fixed to said blocking lever 5 and at the other end thereof with a side of the lever 6. The operating lever 6 is urged counterclockwise by means of a tension spring 7 and the counterclockwise movement of the operating lever 6 is stopped by a pin 8a fixed to a recovery lever 8. The recovery lever 8 is rotatably provided in the camera body and the lower end 8b thereof is engaged with an end of a tension spring 8c to urge the recovery lever clockwise. The lower end 8b is further engaged with a pin 3e fixed to said operating plate 3 so that the operating plate 3 makes the recovery lever 8 rotate counterclockwise when the oerating plate 3 is moved downward The lower end of the operating lever 3 is provided with a ramp 3f which is engaged with an end 9a of a leading curtain holding lever 9 which is rotatably provided. The other end 9b of the lever 9 is engaged with a member 25 fixed to a shaft 23. On the shaft 23 is fixed a pair of drums 24 on which a part 20 of the leading curtain (not shown) is wound. The lower portion of the operating plate 3 is provided with a pin 3g which is brought into a position to close a third switch SW3 when the operating plate 3 is moved downward and is in a position to open the third switch SW3 and close a second switch SW2 when the oerating plate 3 is in its upper postion as shown in FIG. 1. The operating lever 6 is provided with a projecting portion 6b and a cutaway portion 6c which are to be engaged with a pin 10afixed to a starting lever 10. The starting lever 10 is urged counterclockwise by a tension spring 11 and is provided with an iron piece 10b to be attracted by a magnet 14 and with an arm 10c to be engaged with an end 12a of a trailing curtain holding lever 12. The trailing curtain holding lever 12 is engaged with a member 26 fixed to a shaft 27 to which is fixed a drum 28 having the leading curtain 29 wound thereon. The trailing curtain holding lever 12 is urged counterclockwise by means of a tension spring 13 so that the end 12a of the lever 12 may always be urged to be in contact with the arm 10c of the starting lever 10.

Further, the starting lever 10 is associated with a change-over plate 15 which is used to change the state of the device from that of automatic shutter control to that of mechanical shutter control. By the change-over plate 15, the automatic shutter speed controlling means in accordance with the present invention is nullified. The upper portion of the change-over plate 15 is provided with a projection 15a which is in contact with a ramp portion 21a of a shutter speed dial 21 and is movable up and down and urged upward by means of a spring (not shown). The lower portion of the change-over plate 15 is provided with a pin 15b which is in contact with the upper edge of the starting lever 10 to limit the upward movement of this upper edge of the starting lever 10. The leading curtain and the trailing curtain are urged to run by means of a well known mechanism associated with said members 25 and 26, the details of which are omitted here for simplification of the description of the invention. When the leading curtain holding lever 9 is disengaged from the member 25, the leading curtain is released to run, and when the trailing curtain holding lever 12 is disengaged from the member 26, the trailing curtain is released to run.

Figure 7:
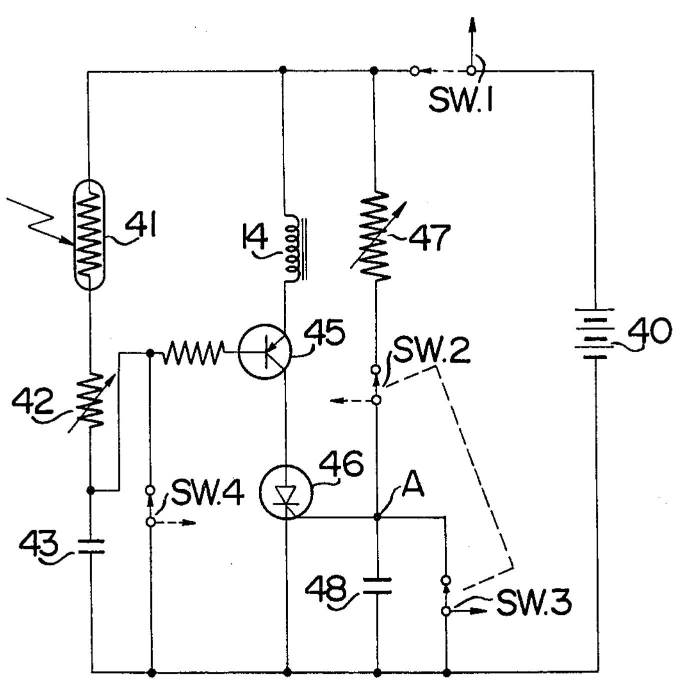
FIG. 7 is a circuit view showing an embodiment of an electric circuit for controlling the focal plane shutter in which a selftimer is provided.

An example of the electric circuit associated with the above mechanism to control the electric focal plane shutter is illustrated in FIG. 7. A photodetector 41 is connected in series with a first variable resistor 42 and a first capacitor 43. The first variable resistor 42 is varied according to the stop, and the first capacitor 43 is used to control the exposure time in combination with the photodetector 41 and the first variable resistor 42. The series circuit of the photodetector 41 and the first variable resistor 42 and the first capacitor 43 are connected in series with a power source 40 by way of a power switch SW1 which is closed upon depression of the shutter release button. Across the power source 40 is also connected a magnet 14 by way of a switching transistor 45, which is connected with a connecting point between said first variable resistor 42 and said first capacitor 43, and a thyristor 46. In parallel with said first capacitor 43 is connected a fourth switch SW4. A series circuit of a second variable resistor 47 and a second switch SW2 is connected in series with a parallel circuit of a second capacitor 48 and a third switch SW3. The second switch SW2 and the third switch SW3 are operated in the opposite way. That is, when the second switch SW2 is closed, the third switch SW3 is opened and vice versa. The magnet 14 is used to operate the shutter and the second variable resistor 47 is used to set the delay time. The second capacitor 48 is used to control the delay time.

In operation of the above described electric circuit shown in FIG. 7, the power switch SW1 is first closed when the shutter release button is depressed and the second capacitor 48 is charged. The second variable resistor 47 is set in accordance with the delay time of the selftimer used. After a time which is determined by the time constant set by the second variable resistor 47 and the second capacitor 48, i.e. the operation time of the selftimer, has lapsed, the charging of the second capacitor 48 is finished. When the capacitor 48 is fully charged, the potential at the point A rises up to a predetermined level to open the gate of the thyristor 46 and the magnet 14 is excited. The magnet 14 attracts the said iron piece 10*b* of the starting lever 10 to start the operation of the shutter opening. By the shutter opening operation, the second switch SW2 is opened and the third switch SW3 is closed to discharge the second capacitor 48, and the fourth switch SW4 is opened. When the fourth switch SW4 is opened, the first capacitor 43 which has been charged through the photodetector 41 and the first variable resistor 42 according to the illumination of the object to be photographed starts to discharge. When the terminal voltage of the first capacitor 43 exceeds the emitter voltage of the switching transistor 45, the switching transistor 45 is operated to cut the current to the magnet 14 and the magnet 14 is demagnetized to release the starting lever 10. Then, the shutter is closed.

Figure 2:
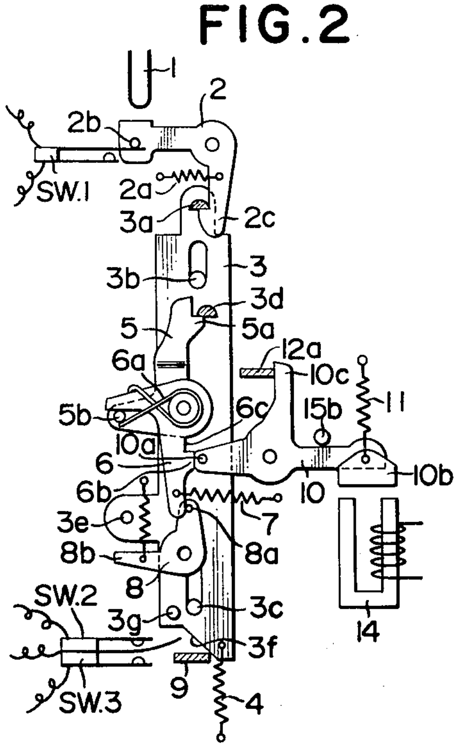
FIGS. 2 to 6 are fragmentary side views showing a part of the device as shown in FIG. 1 wherein the operative positions of the mechanism employed in the device are depicted.
Figure 3:
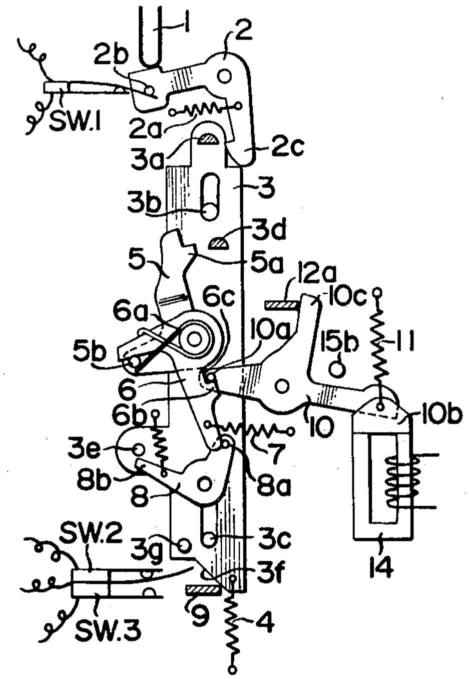

Now the operation of the above described mechanism shown in FIG. 1 will be described in detail in connection with the electric circuit shown in FIG. 7 and hereinabove described. When the preparation of photographing operation of the camera is completed with the film wound and with the shutter charged and with the shutter dial 21 set in the position to automatically control the exposure time, the elements constituting the device in accordance with the present invention are in those positions as shown in FIGS. 2 and 7. It is assumed that the second variable resistor 47 associated with the selftimer is set to be at zero in this case. When the shutter release button 1 is depressed in the above described situation as shown in FIGS. 2 and 7, the release lever 2 is rotated counterclockwise and the first switch SW1 is closed to energize the circuit as shown in FIG. 7. By the counterclockwise rotation of the shutter release lever 2, the pin 3*a* of the operating plate 3 is released from the hook 2*c* and enabled to move downward. However, the operating plate 3 is prevented from moving downward since the pin 3*d* fixed to the operating pin 3 is blocked by the blocking lever 5. As the first switch SW1 is closed, the magnet 14 is excited to attract the iron piece 10*b* of the starting lever 10. As the starting lever 10 is rotated clockwise because of the attraction of the iron piece 10*b* by the magnet 14, the pin 10*a* engaged with the projection 6*b* of the operating lever 6 is put into engagement with the cut-away portion 6*c* thereof as shown in FIG. 3. Since the operating lever 6 is urged to rotate counterclockwise by the spring 7, the pin 5*b* of the blocking lever 5 is pushed down by the operating lever 6 and the blocking lever 5 is rotated out of engagement with the pin 3*d* of the operating plate 3. Thus, the operating plate 3 is set free to move downward through the tension of the spring 4. By the clockwise rotation of the starting lever 10, the trailing curtain holding lever 12 is moved to the holding position as shown in FIG. 3. Thus, the trailing curtain is prevented from running. In the above operation, said magnet 14 is excited immediately after the closure of the first switch SW1 since the second capacitor 48 is instantly charged and the gate of the thyristor 46 is opened.

Figure 4:
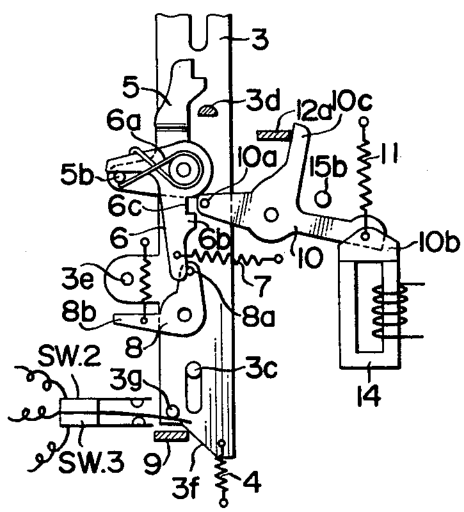
Figure 5:
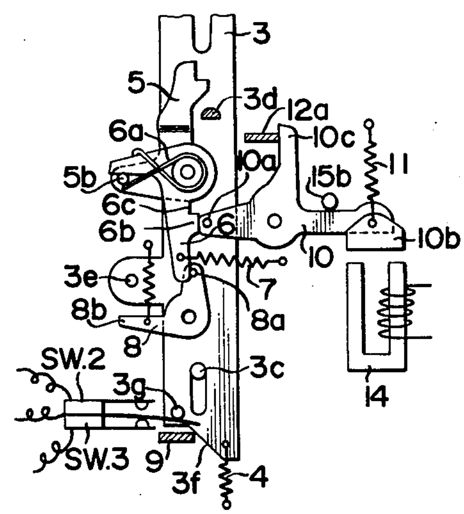

When the operating plate 3 is moved downward quickly by the force of the spring 4, the ramp 3f formed at the lower end thereof moves the leading curtain holding lever 9 to the left as in FIG. 4 and releases the holding of the leading curtain to start the exposure by rotating the leading curtain holding lever 9 counterclockwise. At this time or immediately therebefore, the fourth switch SW4 is opened in the manner as is well known in the art to start the charging of the capacitor 43 at the speed corresponding to the illumination of the object to be photographed. Further, as the operating plate 3 move downward, the pin 3*g* fixed thereto opens the second switch SW2 and closes the third switch SW3 and accordingly the capacitor 48 for the thyristor 46 is discharged. Also, when the operating plate 3 is moved downward, the pin 3*e* fixed thereto comes into engagement with the recovery lever 8 and makes the recovery lever 8 rotate counterclockwise. Therefore, the recovery lever 8 acts to rotate the operating lever 6 clockwise by the abutment of the pin 8*a* on the lower portion of the operating lever 6, and accordingly, the blocking lever 5 is also rotated clockwise together with the operating lever 6 as shown in FIG. 4. Thus, the cut-away portion 6*c* of the operating lever 6 is separated from the pin 10*a* of the starting lever 10 leaving the starting lever 10 in the position attracted by the magnet 14 as shown in FIG. 4.

When the amount of charge stored in the first capacitor 43 reaches a predetermined level in accordance with the illumination of the object to be photographed after a time has lapsed, the switching transistor 45 is cut off and the magnet 14 is demagnetized accordingly and the iron piece 10*b* is separated from the magnet 14. Thus, the starting lever 10 is returned to its original position by the tension of the spring 11, where the upper edge thereof is in contact with the pin 15*b* of the change-over plate 15. By the return motion of the starting lever 10, the trailing curtain holding lever 12 is rotated clockwise to release the member 26 and allow the advance of the trailing curtain to complete the exposure. The pin 10*a* on the starting lever 10 is moved back to the position to be in contact with the projection 6*b* of the operating lever 6. Then, when the film is wound up and the shutter charged, the operating plate 3 is moved upward by means of a mechanism not illustrated and the pin 3*a* of the operating plate 3 is engaged with the hook 2*c* of the shutter release lever 2. Thus, all the elements are brought to their original positions as shown in FIG. 2.

When a selftimer is used in connection with the above described device in accordance with the present invention, the selftimer is associated with the second variable resistor 47 to set the variable resistor 47 in correspondence to the time of operation of the selftimer, and the shutter dial 21 is left in its automatic exposure position. Then, the shutter button 1 is depressed as in the foregoing case. Upon depression of the shutter button 1, the first switch SW1 is closed and the second capacitor 48 starts to be charged. The time for charging the second capacitor 48 is determined by the level of the resistance of the second variable resistor 47. When the time as determined as above has lapsed, the gate of the thyristor 46 is opened and the magnet 14 is excited. Then, the shutter is released in just the same manner as in the foregoing description. In the above described embodiment in which a selftimer is employed, the circuit for starting the shutter release and exciting the magnet for holding the trailing curtain is controlled electrically by means of a thyristor and an RC circuit. However, it will be understood that a contact switch can be replaced therefor if the contact switch is controlled by means of a mechanical governor so that the switch may be closed when a predetermined time has lapsed.

When a cell serving as a power source for the automatic exposure control circuit is not loaded in the camera or the cell is consumed to such a low predetermined level that the magnet cannot be excited thereby, the blocking lever 5 is not separated from the pin 3*d* by the operation of the starting lever 10 since the magnet 14 is not excited. Therefore, the shutter is not released. Thus, misoperation of the camera can be prevented and waste exposure of the film is prevented accordingly.

Figure 6:
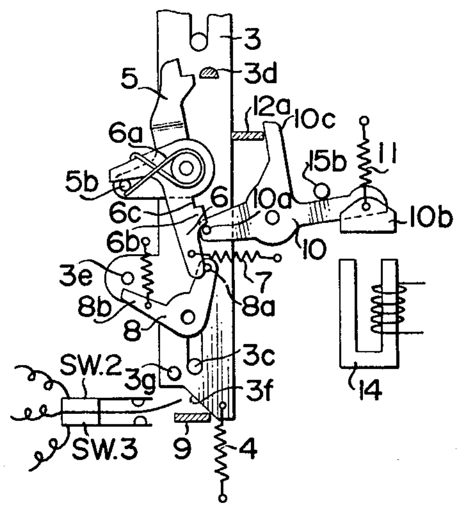

When the shutter speed is selected manually by means of a mechanical controlling means instead of by the automatic exposure controlling means as described above, the shutter dial 21 is rotated to select the shutter speed. By the rotation of the shutter dial 21, the ramp portion 21*a* formed on the lower face thereof moves to allow the upward movement of the change-over plate 15. The change-over plate 15 is moved upward by the tension of a spring and the pin 15*b* to stop the upward movement of the starting lever 10 is also moved upward to allow the upward movement of the starting lever 10. Therefore, the starting lever 10 is moved upward or, more exactly, rotated counterclockwise by the tension of the spring 11, and the pin 10*a* fixed thereto is separated from the projection 6*b* of the operating lever 6 as shown in FIG. 6. Thus, the operating lever 6 and the blocking lever 5 are allowed to rotate in the counterclockwise direction. Then, the blocking operation of the blocking lever 6 is nullified and the operating plate 3 is set free to move downward. Therefore, the shutter can be released without the excitation of the magnet 14. Thus, the manual operation of the shutter is made possible. Further, in this case, the trailing curtain holding lever 12 is nullified. Therefore, the trailing curtain must be operated by means of a mechanical control means in this case.

I claim:

1. A device for controlling an electric focal plane shutter in a camera comprising in combination;

a leading shutter curtain movable between a start position and a final position along the focal plane of a camera, a trailing shutter curtain movable between a start position and a final position along the focal plane of the camera, a shutter release button provided on the camera, a shutter release member provided in the camera which is moved upon depression of said shutter release button, an electromagnet which is excited in response to depression of said shutter release member and demagnetized when a predetermined time has lapsed since the start of excitation thereof, a leading curtain driving means for making the leading shutter curtain run across the focal plane from the starting position to the final position, a leading curtain holding means movable between a first position to hold the leading shutter curtain in its start position and a second position to allow the leading shutter curtain to be driven by the leading curtain driving means and run from the start position to the final position, an actuating member provided between the shutter release member and the leading curtain holding means, and movable between a first position and a second position, said actuating member being moved from the first position to the second position to move the leading curtain holding means from said first position to said second position in response to movement of the shutter release member upon depression of said shutter release button, a blocking member movable between a blocking position to hold the actuating member in said first position and a releasing position to allow the actuating member to be moved from said first position to said second position, a trailing curtain driving means for making the trailing shutter curtain run across the focal plane from a start position to a final position, a trailing curtain holding means movable between a first position to hold the trailing shutter curtain in its start position and a second position to allow the trailing shutter curtain to be driven by the trailing curtain driving means and run from the start position to the final position, a starting lever which is moved by said electro-magnet upon excitation thereof from a first position wherein the starting lever holds said blocking member in its blocking position and holds said trailing curtain holding means in its first position to a second position wherein the starting lever allows said blocking member to move from its blocking position to its releasing position and allows said trailing curtain holding means to move from its first position to the second position, said starting lever being unmoved by said electromagnet when the voltage applied to the electromagnet is below a predetermined level, a delay circuit comprising a capacitor and a resistor connected with said electromagnet, and a first switch connected across said capacitor for short-circuiting the capacitor to completely discharge the same, said switch being located at a position where the same is closed upon movement of said actuating member.

2. A device for controlling an electric focal plane shutter according to claim 1 wherein said actuating member is a slidable plate which is urged in one direction to move said leading curtain holding lever to the second position and is engaged with said shutter release member.

3. A device for controlling an electric focal plane shutter according to claim 2 further comprising an operating lever engaged with said blocking member which is engaged with said slidable plate, said operating lever being engaged with said starting lever so that the operating lever may bring said blocking lever into the blocking position when said actuating lever is in the first position and bring said blocking lever into the releasing position when said actuating lever is in the second position.

4. A device for conrolling an electric focal plane shutter according to claim 1 wherein said starting lever is a rotatable lever having three arms, the first arm thereof having at an end thereof an iron piece to be attracted by said magnet, the second arm thereof having at an end thereof a pin engaged with said blocking member, and the third arm thereof being engaged with said trailing curtain holding lever.

5. A device for controlling an electric focal plane shutter according to claim 1 further comprising a second switch connected between the resistor and the capacitor of said delay circuit, said second switch being normally closed and opened when said first switch is closed.

* * * * *